July 24, 1923. 1,463,042
J. KRYSIAK
MOTOR SLEIGH
Filed June 8, 1922
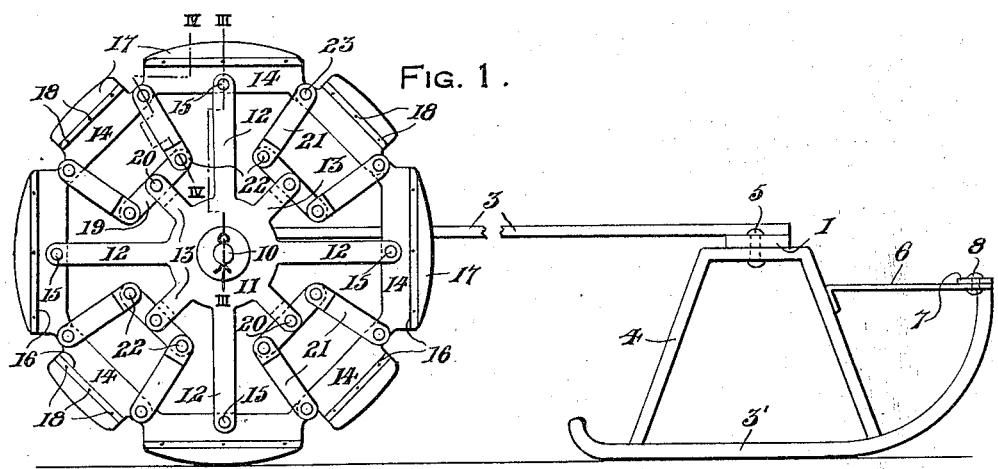
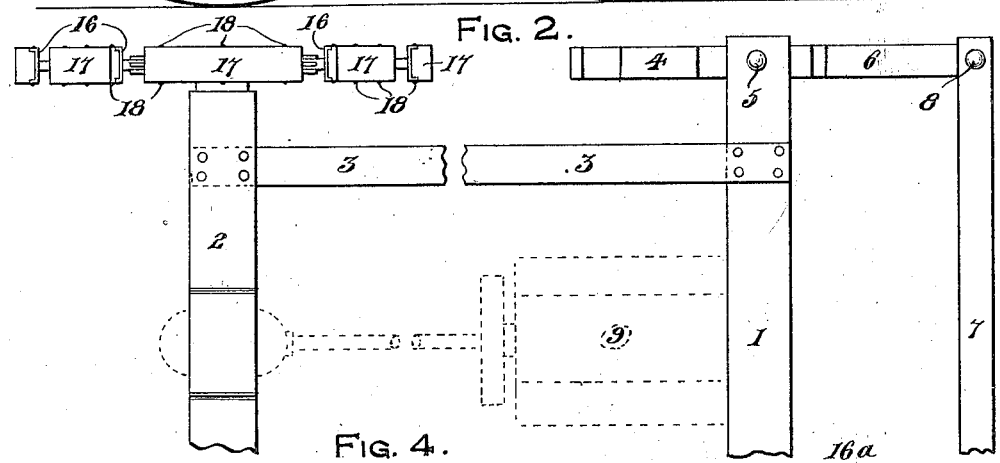
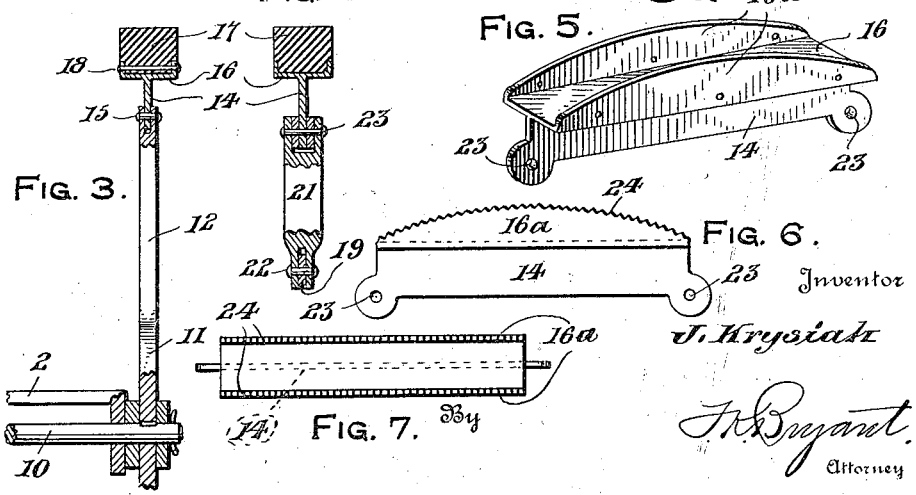
Inventor
J. Krysiak
By F. K. Bryant
Attorney Patented July 24, 1923.

1,463,042

UNITED STATES PATENT OFFICE.

JOHN KRYSIAK, OF FOUR CORNERS, WYOMING.

MOTOR SLEIGH.

Application filed June 8, 1922. Serial No. 566,771.

*To all whom it may concern:*

Be it known that I, JOHN KRYSIAK, a citizen of Poland, residing at Four Corners, in the county of Weston and State of Wyoming, have invented certain new and useful Improvements in Motor Sleighs, of which the following is a specification.

This invention relates to certain new and useful improvements in motor sleighs, and embodies a sleigh frame supporting a motor with steering runners carried at the forward end of the frame and rear driving wheels operated by the motor.

The primary object of the invention resides in the provision of a special type of driving wheel having movable tread sections pivotally connected together, and to the spokes of the wheel to cause the tread sections successively to engage the ground.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like designating characters refer to corresponding parts throughout the several views:

Figure 1 is a fragmentary side elevational view of a motor sleigh constructed in accordance with the present invention, showing the improved driving wheel therefor, Figure 2 is a fragmentary top plan view of the sleigh frame, Figure 3 is a detail sectional view taken on line III—III of Figure 1 showing one of the long radial spokes for pivotally supporting a tread block, Figure 4 is a detail sectional view taken on line IV—IV of Figure 1 showing one of the link members associated with the shorter spokes of the wheel, Figure 5 is a perspective view of a modified form of tread plate for supporting a block showing the curved side flanges for inclosing the block with plain outer edges, Figure 6 is a side elevational view of the type of tread plate shown in Figure 5, with the outer edges of the side flanges serrated, and Figure 7 is a top plan view of the tread plate shown in Figure 6.

Referring more in detail to the accompanying drawings, and particularly to Figures 1 and 2 there is ilustrated a sleigh frame embodying front and rear cross bars 1 and 2 connected by longitudinal side bars 3. A sleigh runner 3' is associated with each end of the forward cross bar 1, and is connected thereto by means of a bracket 4 pivotally connected at 5 as illustrated, the extreme forward end of each runner being braced by the arm 6 extending between the forward end of the runner and the adjacent leg of the bracket frame 4 while a cross rod 7 is pivotally connected as at 8 to the forward ends of said runners 3'. An ordinary type of steering mechanism, such as is associated with an automobile is provided for shifting the runners 3' to effect steering of the sleigh.

The present invention has more particular reference to the type of driving wheels associated with the sleigh, the driving means for said wheels embodying a motor mechanism 9 indicated by dotted lines in Figure 2 embodying the usual differential mechanism that is associated with the rear cross bar 2 that supports a rear axle 10 as clearly shown in Figures 1 and 3. The driving wheels upon the axle 10 each embody a hub portion 11 having preferably four relatively long radial spokes 12 and four relatively short intermediate spokes 13. A tread member is pivotally connected intermediate its ends to the outer end of each spoke 12 and embodies a base flange 14 pivoted as at 15 to the outer end of the spoke 12, a U-shaped channel 16 carried by the base flange 14 supporting a cushioned tread block 17 that is anchored within the U-shaped channel by cross bolts 18 extending through the side walls of said channel, and the cushion block 17 as clearly shown in Figure 3.

A lever arm 19 is pivotally mounted intermediate its ends as at 20 to each of the shorter spokes 13, while a link 21 is pivotally connected as at 22 to each end of the levers 19. A relatively short tread plate is disposed between the adjacent ends of the tread plates pivotally connected to the longer spokes 12, the outer ends of the base flanges 14 being pivotally connected as at 23 to the links 21 and relatively short tread plates as clearly shown in Figures 1 and 4.

A modified form of tread plate is shown in Figure 5 wherein the side flanges 16ª of the U-shaped channel 16 are curved or arched outwardly to present the outer edges thereof in transverse alignment with the tread surface of the cushioned tread block 17. In the form of the invention shown in Figures 6 and 7, the outer curved edges of the side flanges 16ᵃ are serrated as at 24 to afford better road gripping edges for increasing the traction of the wheel.

The operation of the drive wheels during travel over a roadbed is as follows:

When the longer spokes extend in true horizontal and vertical positions, as shown in Fig. 1, the wheel is not distorted, but as it travels over the road and the load of the vehicle is shifted to the forward end of the supporting, longer tread block, the latter is caused to be pivoted on its supporting long spoke 12 thereby moving the next subsequent link member 21 inwardly substantially longitudinally with the result that its pivotally connected lever 19 is actuated to move the second link member 21 outwardly substantially longitudinally to throw the ground approaching short tread block on a plane substantially the same as that occupied by the long tread block referred to above. As the wheel continues to travel over the roadbed, the load continues to shift until it is directly over the center of the ground engaging short tread block when the wheel will be returned to a non-distorted position. By following the operation of the wheel still further, it will be seen that the link 21 connected to the forward end of the short tread block will be moved inwardly longitudinally and due to the pivotal connection between the present ground engaging short tread block and the ground approaching long tread block, the latter will be moved into a plane substantially the same as that occupied by the short tread block in question. It is to be understood that the various tread blocks, link members, and levers will be free to operate in conjunction with those associated with the ground, and will therefore permit movement of the various elements as described above. The object of this construction is obvious for it permits at intermittent intervals the positioning of relatively long and short tread blocks in engagement with the roadbed at the same time, thereby greatly increasing the wheels traction ability. The rear axle 10 is driven in the usual manner through the differential mechanism of the motor 9 while the steering of the forward runners 3' is accomplished by the employment of the ordinary steering mechanism for a motor vehicle.

While the form of the invention herein shown and described is what is believed to be the preferred embodiment thereof, it is nevertheless to be understood that various forms, modifications and arrangements of the parts may be made without departing from the spirit and scope of the invention as claimed.

Having thus described the invention, what I claim as new is:—

1. In a device of the class described, a driving wheel including a hub, relatively long radial spokes carried thereby, relatively short intermediate spokes carried by said hub, a tread block pivotally secured intermediate its ends to the outer end of each longer spoke, intermediately positioned tread blocks pivotally secured at their opposite ends to the adjacent ends of the aforesaid tread blocks, and link connection between the pivoted ends of said blocks and the shorter spokes whereby two adjacent tread plates will be intermittently moved into engagement with the ground at one time.

2. In a device of the class described, a driving wheel including a hub, relatively long radial spokes carried thereby, relatively short intermediate spokes carried by said hub, a tread block pivotally secured intermediate its ends to the outer end of each longer spoke, intermediately positioned tread blocks pivotally secured at their opposite ends to the adjacent ends of the aforesaid tread blocks, a lever arm pivotally secured intermediate its ends to each shorter spoke and a link connection between each end of the lever arm and the adjacent pivotal connection between the tread blocks whereby two adjacent tread plates will be intermittently moved into engagement with the ground at one time.

3. In a device of the class described, a driving wheel including a hub, relatively long radial spokes carried thereby, relatively short intermediate spokes carried by said hub, a tread block pivotally secured intermediate its ends to the outer end of each longer spoke, intermediately positioned tread blocks pivotally secured at their opposite ends to the adjacent ends of the aforesaid tread blocks, and lever and link connection between the shorter spokes and the pivotal connection between adjacently positioned tread blocks whereby two adjacent tread plates will be intermittently moved into engagement with the ground at one time.

4. In a device of the class described, a motor driven wheel embodying a hub, radial spokes carried thereby, the alternate spokes being of shorter length, a tread plate pivotally secured intermediate its ends to each of the longer spokes, an intermediately positioned tread plate pivotally secured at its ends to the aforesaid tread plates, link and arm connection between the intermediately positioned tread plate and the shorter spokes whereby two adjacent tread plates will be intermittently moved into engagement with the ground at one time, each tread plate including a base flange, a U-shaped channel carried by the outer edge thereof and a cushioned block mounted in said channel.

5. In a device of the class described, a motor driven wheel embodying a hub, radial spokes carried thereby, the alternate spokes being of shorter length, a tread plate pivotally secured intermediate its ends to each of the longer spokes, an intermediately positioned tread plate pivotally secured at its ends to the aforesaid tread plates, link and arm connection between the intermediately positioned tread plate and the shorter spokes whereby two adjacent tread plates will be intermittently moved into engagement with the ground at one time, each tread plate including a base flange, a U-shaped channel carried by the outer edge thereof, a cushioned block mounted in said channel, the side walls of the channel being curved outwardly and serrated at their outer edges.

In testimony whereof I affix my signature.

JOHN KRYSIAK.